June 25, 1946.  M. L. SPEALMAN  2,402,785
PROCESS FOR PURIFYING CARBON DISULPHIDE
Filed Nov. 9, 1943
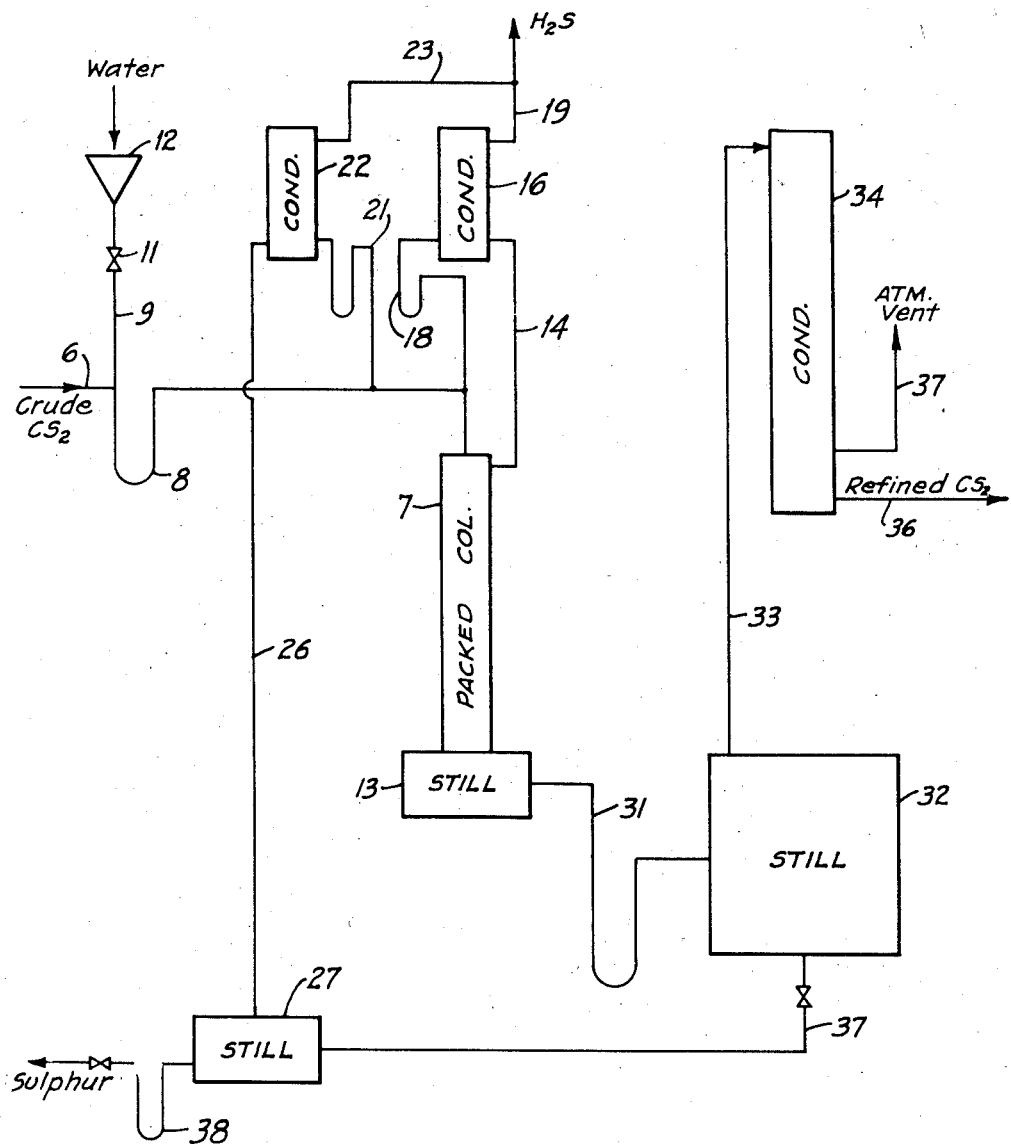
INVENTOR.
Max L. Spealman
BY Robert H. Eckhoff
ATTORNEY.

Patented June 25, 1946

2,402,785

UNITED STATES PATENT OFFICE 2,402,785

PROCESS FOR PURIFYING CARBON DISULPHIDE

Max L. Spealman, San Francisco, Calif., assignor to Stauffer Chemical Company, a corporation of California Application November 9, 1943, Serial No. 509,563

2 Claims. (Cl. 23—206)

This invention relates to the purification of crude carbon disulphide.

The impurities present in largest amount in crude carbon disulphide are hydrogen sulphide and sulphur. There are also other impurities present in lesser amounts. The usual manner of purification is by distillation, typical processes for which are shown in the Legeler Patent No. 1,672,948 and in various British and German patents to Zahn and Co., including British Patent No. 261,990. These distillation purification processes consist essentially of two operations, one of which is refluxing to remove hydrogen sulphide and the other of total distillation to separate the carbon disulphide and the sulphur. Either of these essential operations may be done first, followed by the other operation.

One of the usual methods for testing purified carbon bisulphide for freedom from hydrogen sulphide is with an aqueous solution of lead acetate. If hydrogen sulphide is present, black lead sulphide will be formed in the test tube.

I have observed that crude carbon bisulphide from which hydrogen sulphide and sulphur have been removed by distillation will usually produce a small amount of a colored precipitate ranging from yellow to orange to dark brown and even black when tested with lead acetate, due to an impurity or impurities present in small amount, the identity of which has not been definitely established. For example, when the presently described distilling apparatus shown in the accompanying drawing is first started, a yellow to orange precipitate will result in testing with lead acetate. With continued operation of the distilling apparatus, the color of the precipitate in the lead acetate test will become darker and after a long enough period of operation will become black. This change in color is due to a slow decomposition of the impurity or impurities during the distillation process, with the resultant formation of some hydrogen sulphide.

I have discovered that this impurity can be removed or destroyed by carrying out the first of the two essential operations described above in the presence of a small amount of water. It is assumed but as yet is not definitely proven that the water reacts chemically with the objectionable impurity and thus destroys it. The quantity of water required is quite small and I have successfully operated on a commercial scale using one pint of water per ton of crude carbon disulphide; more or less can be employed as required. It is desirable to feed the water to the still in a continuous or semi-continuous manner but batch addition of the water also can be used.

To illustrate the practice of the present invention, I have hereinafter set forth one manner in which it has been successfully practiced. In the drawing accompanying and forming a part hereof the single figure is a flow sheet and diagrammatic representation of simple equipment which can be employed. Those skilled in chemical engineering can readily provide the specific apparatus required.

Referring to the drawing, crude carbon disulphide is fed through line 6 into the top of a packed column 7. A U bend 8 is provided in line 6 and water is fed into this through line 9 under the control of valve 11 from a receptacle 12.

A heated still 13 is provided at the base of the column 7. Vapors, particularly hydrogen sulphide, are taken off the top of the column through line 14 and then introduced into a condenser 16. Any liquid forming in the condenser is returned through line 18 to the top of the column while gaseous products are drawn off through line 19.

Carbon disulphide collecting in still 13 is transferred through line 31 into a still 32 wherein the carbon disulphide is vaporized and taken off through line 33 into a condenser 34. The refined carbon disulphide is removed through line 36 while any gaseous products are released through the atmospheric vent line 37. The still bottoms, mainly consisting of sulphur, are drawn off through line 37 into still 27 wherein the sulphur is separated from any residual carbon disulphide. The sulphur is withdrawn through line 38 and the carbon disulphide is passed through line 26 into condenser 22, any liquid products collecting in the condenser being returned through line 21 to the feed line 8 while any gaseous products are passed through line 23 to the hydrogen sulphide exit line 19 from condenser 16.

Those skilled in the art of chemical engineering can readily provide the valves and other supplementary control devices required for practice of the invention, inasmuch as the details of these form no part of this invention. The distillation process shown is merely by way of example, as any other process can be employed for this.

I claim:

1. A process for purifying carbon disulphide comprising adding water to crude carbon disulphide in the proportion of about one pint of water per ton of carbon disulphide and then distilling the carbon disulphide in the presence of the added water.

2. A process for purifying crude carbon disulphide comprising adding a small quantity of water to the carbon disulphide and then distilling the crude carbon disulphide in the presence of the added water.

MAX L. SPEALMAN.